United States Patent
Terfloth et al.

(10) Patent No.: US 7,005,476 B1
(45) Date of Patent: Feb. 28, 2006

(54) MULTICOMPONENT COATING AND ADHESIVE MATERIAL

(75) Inventors: Christian Terfloth, Detmond (DE); Theodor Hippold, Bad Salzuflen (DE)

(73) Assignee: Jowat Lobers und Frank GmbH & Co. KG, Detmold (DE)

( * ) Notice: Subject to any disclaimer, the term of this patent is extended or adjusted under 35 U.S.C. 154(b) by 0 days.

(21) Appl. No.: 09/913,008

(22) PCT Filed: Feb. 10, 2000

(86) PCT No.: PCT/DE00/00384

§ 371 (c)(1),
(2), (4) Date: Oct. 12, 2001

(87) PCT Pub. No.: WO00/47687

PCT Pub. Date: Aug. 17, 2000

(30) Foreign Application Priority Data

Feb. 11, 1999 (DE) .............. 199 05 9071

(51) Int. Cl.
*C08L 75/04* (2006.01)
(52) U.S. Cl. .............. 525/123; 525/127; 525/131; 524/578; 524/590; 524/871; 524/874; 524/875
(58) Field of Classification Search .............. 525/127, 525/131, 123; 524/578, 590, 871, 874, 875
See application file for complete search history.

(56) References Cited

U.S. PATENT DOCUMENTS

| | | | |
|---|---|---|---|
| 3,931,077 A * | 1/1976 | Uchigaki et al. ........... 524/272 |
| 4,871,590 A * | 10/1989 | Merz et al. ................. 427/387 |
| 4,895,567 A * | 1/1990 | Colon et al. ................. 604/361 |
| 5,155,180 A | 10/1992 | Takada et al. ............... 525/440 |
| 5,441,808 A | 8/1995 | Anderson et al. ........... 438/349 |
| 5,623,019 A * | 4/1997 | Wiggins et al. ........... 525/92 C |
| 5,710,215 A * | 1/1998 | Abend ......................... 525/124 |
| 5,827,926 A * | 10/1998 | Shimizu ...................... 525/127 |
| 5,869,593 A * | 2/1999 | Helmeke et al. .............. 528/83 |
| 5,977,283 A * | 11/1999 | Rossitto ........................ 528/44 |
| 6,169,124 B1 * | 1/2001 | Horn et al. .................. 521/155 |
| 6,174,959 B1 * | 1/2001 | Ciebien et al. ............. 525/131 |
| 6,207,248 B1 * | 3/2001 | Yang et al. .................. 428/102 |
| 6,482,878 B1 * | 11/2002 | Chu ........................... 524/271 |

FOREIGN PATENT DOCUMENTS

| | | |
|---|---|---|
| DE | 19624236 A | 1/1998 |
| EP | 0304026 B1 | 1/1994 |
| EP | 0619343 | 10/1994 |
| GB | 2201677 A | 9/1988 |
| WO | WO93/25599 | 12/1993 |

OTHER PUBLICATIONS

"Polyamide Adhesives", *Handbook of Ahesives*, Second Edition, R. D. Dexheimer et al., pp. 581-590.
The ICI Polyurethanes Book, Second Edition, George Wood, pp. 93-95.

* cited by examiner

*Primary Examiner*—Jeffrey B. Robertson
(74) *Attorney, Agent, or Firm*—Cohen, Pontani, Lieberman & Pavane

(57) ABSTRACT

Disclosed is a multicomponent, isocyanate-terminated or silane-functionalized coating and adhesive material which is continuously produced by mixing the individual components and by heating the latter and continuing mixing until said components reach a liquid state, wherein the resulting reactive coating and adhesive material is fed for direct use especially in profile sheathing plants, coating plants or the like. In the case of isocyanate-terminated material, one component has a reactive high-molecular weight starting polymer and a second component has a reactive isocyanate-terminated cross-linking agent. In the case of the silane-functionalized material, one component has a high-molecular weight starting material and a second component has a reactive, silane-functionalized cross-linking agent.

30 Claims, No Drawings

MULTICOMPONENT COATING AND ADHESIVE MATERIAL

PRIORITY CLAIM

This is a U.S. national stage entry of application No. PCT/DE00/00384, filed on Feb. 10, 2000.

BACKGROUND OF THE INVENTION

Reactive, solvent-free adhesives cross-linkable with moisture from the air, particularly hot-melt adhesives, are well known in the state of the art. Such adhesives are prepared from low-molecular starting materials comprising OH groups, such as polyesters or polyethers, which are then converted to reactive isocyanate-terminated ahesives with a stoichimetric excess of isocyanates. 4,4'-diisocy-anato-diphenylmethane (MDI), 1,5-diisocyanato-naphthalene (NDI), 1,6-diisocyanato-hexane (HDI), 2,4-diisocyanato-toluene (TDI), 1-isocyanato-3-isocyanatomethyl-3,5,5-trimethylcyclohexane (IPDI) or their prepolymers can be used as isocyanate components.

Alternatively, said reactive coating and adhesive materials can also be produced on the basis of a silane-functionalized polymer. The addition of catalysts, resins and other additives and adjuvants is usual.

Depending on the above starting materials and their average molecular weights and on the desired properties of the adhesive to be produced, the underlying polyaddition reaction can take several hours. Two or more adhesive components are brought together and are processed, under the effect of heat, to give a hot, liquid mass which, in this state, can be used as a hot-melt adhesive. The cross- linking reaction takes place by taking moisture from the air and/or from a wetted surface. This means that after their preparation, these hot-melt adhesive must be kept dry, with any moisture from the air being eliminated.

Therefore, for transportation and storage such an adhesive is filled into tightly sealable containers (e.g. 20-liter or 200-liter tin-barrels) and is stored in a dry state there, with any moisture from the air being eliminated. Before use, the cooled and generally solid adhesive must be melted out of these containers and conveyed or fed to the processing and application units. Melting is achieved, for example, by means of a barrel-melter (melting device) whose heatable piston provided with sealing rings or joints is brought under pressure into a container filled with said adhesive. By means of a gear-type pump installed in the piston, the molten and viscous to fluid hot-melt adhesive is conveyed or fed through heated conduits or pipes to an application unit. Depending on the size of the container and on the adhesive formulation, the melting capacity of such a barrel- melter is in the range of about from 20 to 80 kg/hour.

In some fields of application such a melting capacity is, however, not sufficient, particularly not for the coating of flat surfaces. In addition, when relatively small barrels are used, it is impossible to achieve substantially continuous operation because of frequent changing of said barrels. Besides, the purchase of a barrel melter by the user means a considerable capital investment. If the container which contains the hot-melt adhesive becomes leaky during transportation, the adhesive can rapidly become unusable, particularly if it is exposed to moisture. Another disadvantage is that after opening the container, the adhesive must be processed completely and in a relatively short time because any adhesive resi- dues become unusable relatively rapidly.

Another disadvantage of the state of the art described before is the restriction that the use of such systems is limited exclusively to reactive adhesives only. The alternating processing of reactive adhesives and thermoplastic adhesives (based on EVA, APAO or PA) is disadvantageous for both economical and technical reasons.

The use of multicomponent systems in the production of hot-melt adhesives and coating materials is generally known per se. A feature common to the systems disclosed in EP 0 304 026 B 1, in the Handbook of Adhesives, 2nd Edition, p. 581 ff and in the ICI polyurethanes book, 2nd Edition, p. 93 ff, is that the com- ponents exclusively react with one another and that, after the reaction has taken place, they no longer have any reactivity for secondary reactions, e.g. with moisture. Also, the components have necessarily to be used and consumed directly after mixing.

THE INVENTION

The afore-mentioned technical problems are solved by the subject matter of the invention. In one aspect of the invention, it is directed to a continuous preparation of the inventive isocyanate- terminated coating and adhesive material (e.g. just at the site where its application is desired) by mixing the components and by heating them, particularly under continued mixing, until a liquid state is reached, in which the material is then available as a reactive coating and adhesive material.

For the isocyanate-terminated coating and adhesive material, it is further pro- vided that at least one component has at least one higher-molecular, reactive starting polymer and a second component has a reactive isocyanate-terminated cross-linking agent.

In the silane-functionalized coating and adhesive material the first component comprises a higher- molecular starting polymer and a second component comprises a reactive, silane-functionalized cross-linking agent.

In the method according to the present invention, a first and at least one second adhesive component are brought into e.g. a screw conveyor for mixing and heating these components in order to produce a two- or multicomponent hot-melt adhesive. There, the components are melted and mixed, wherein a coating and/or adhesive material is produced by applying appropriate process parameters (such as e.g. temperature, pressure, screw length etc.), said parameters depending on the desired coating or adhesive material and on the composition of the compo- nents; the resulting coating and/or adhesive material can be processed or used immediately, particularly it can be conveyed or fed immediately to its applica- tion, preferably to a coating process.

In contrast to the prior art methods where the production installations of the adhesive and the application installations on the other hand are not the same and thus transportation of said adhesive is necessary, said transportation leading to the described disadvantages, the inventive coating and adhesive material is produced in situ at the user who, for example, has available an appropriate screw conveyor, which is economically and technically advantageous. The quantity of adhesive which is actually needed can be specifically produced and this in a continuous process. The disadvantages during transportation or after opening the container according to the state of the art described above thus do not arise in the case of the present invention.

According to a first embodiment of the present invention, an isocyanate termina- tion of the adhesive is provided, particularly one according to which the first component has at least one higher-molecular reactive starting polymer and the second component comprises an isocyanate-terminated cross-linking agent.

According to a second embodiment of the present invention, a silane-functionali- zation of the adhesive is provided, particularly one according to which the second component has a silane-functionalized cross-linking agent.

The first and the second adhesive component can be stored separately from each other, thus resulting in problem-free storage and transportation possibilities and prolonged storage times. According to one embodiment of the present invention, both components can occur advantageously in granular form, wherein, however, liquid storage and transportation forms are generally also possible.

Moreover, it is easy to achieve sufficiently high melting capacities of more than 1100 kg/hour or more and to prepare large quantities of coating or adhesive mate- rial with a screw conveyor. Such a screw conveyor is known per se, for example, as a single-screw extruder.

All adjustments of the screw conveyor (such as temperature, pressure, through- put time etc.) are determined and adapted as a function of the coating and adhe- sive material to be produced and thus as a function of the compositions of the components. The pressure prevailing along the conveying track should be suffi- cient to heat the components, wherein, however, additional heat sources can also be provided so that temperatures of about 200° C. can easily be reached along a short conveying track.

An optionally heatable pipe or conduit conveying or feeding the prepared hot- melt adhesive in liquid form directly to the processing site can be connected to the screw conveyor at the end of the conveying track. In an advantageous manner, the coating or adhesive according to the present invention is produced only when there is a respective need. After using the coating or adhesive, it is easy to clean all the devices brought in contact with the inventive material inso- far as only one of the adhesive components, particularly the adhesive component free from the cross-linking agent, is passed through the screw conveyor, the corresponding pipes/conduits and other installations, thereby achieving a cleaning and flushing.

In addition, when the adhesive is prepared in relatively large quantities, it may also be advantageous to convey or feed the adhesive to the respective use via intermediate containers (intermediate storage containers, buffer tanks). Hereby, a buffer with respect to the preparation of the adhesive and/or and adaptation to given local conditions may be achieved.

According to the present invention, the first adhesive component may comprise at least one polymer which is reactive particularly with respect to isocyanates and/or a resin component and, optionally, a non-reactive polymer. The use of polymers reactive particularly with respect to isocyanates and having average molecular weights of more than 8000 g/mol has proved particularly advanta- geous. Such higher-molecular components, particularly having average molecu- lar weights of 10,000 to 30,000 g/mol, e.g. polyesters, polycaprolactonepoly- esters, polyethers, polyurethanes, polyamides or polytetrahydrofuranes, which have at least two reactive groups with reactive hydrogen atoms per molecule, are capable of reacting with isocyanates. The use of such reactive polymers in quan- tities of from 20 to 100 wt. %, particularly in quantities of from 50 to 95 wt. %, is preferred in the first adhesive component.

Resins which can be used in the first and/or second adhesive component (such as e.g. aliphatic, cyclic or cycloaliphatic hydrocarbon resins, terpene phenol resins, cumaroneindene resins, α-methyl styrene resins, polymerized tall resin ester or ketone aldehyde resins) are not particularly limited. However, resins having low acid numbers, particularly having values lower than 1 mg KOH/g, are preferably used. The contents or amounts of resin(s) in the first and/or second adhesive component can, for example, preferably be about 5 to 35 wt. % and generally between 0 and 70 wt. %.

The first adhesive component may also comprise a non-reactive polymer, wherein, when using ethylene/vinylacetate copolymers, such polymers are pre- ferred which have vinylacetate contents of from 12 to 40%, particularly 18 to 28%, and melting indices (DIN 53735) of from 8 to 800, particularly 150 to 500. However, polyolefins may also be used in an advantageous manner. Polyolefins having average molecular weights $M_n$ of from 5000 to 25,000 g/mol, particularly 10,000 to 20,000 g/mol, and having softening ranges (according to the ring and ball method) of between 80 and 170° C., particularly 80 and 130° C., can be used advantageously in the method according to the present invention. The amounts of the non-reactive polymer(s) in the first adhesive component are not particularly critical and are selected according to the desired coating or adhesive. For example, 5 to 35 wt. % of non-reactive polymer may be present in the first adhe- sive components.

The second adhesive component comprises at least one reactive cross-linking component which may be, according to the first embodiment of the present invention, at least one isocyanate solid at room temperature, or alternatively, according to the second embodiment of the present invention, a silanized poly- mer solid at room temperature in the case of a silane-functionalized adhesive.

The following isocyanate-terminated cross-linking agents have proven to be par- ticularly advantageous: 4,4'-diisocy-anato-diphenylmethane (MDI), 4,4',4"-tri- isocyanato-triphenylmethane, tris-(4-isocyanatophenyl)-thiophosphate, 1,5-di- isocyanato-naphthalene (NDI) or isomers thereof, dimers (dimerisates) of 2,4-diisocyanato-toluene (TDI) and of 1-isocyanato-3-isocyanatomethyl-3,5,5-trimethyl cyclohexane (IPDI) or their hydration products and trimers (trimerisate) of 1-isocyanato-3-isocyanatomethyl-3,5,5-trimethyl cyclohexane (TPDI). According to the present invention the adhesive components may comprise vari- ous other additives generally known for reactive adhesives, such as softeners (plasticizers), e.g. softeners based on phthalic acids or phosphoric acid esters, glycolacetate, high-boiling organic oils, esters or other additives inducing plas- tification, stabilizers, antioxidants (corrosion inhibitors), acid trappers (acid- trapping agents), and/or age inhibitors. These optional components or constitu- ents of the adhesive are selected according to the field of application of the final adhesive product. Such selection is known to the person skilled in the art.

The coating and/or adhesive materials produced or prepared according to the present invention may be used, for example, for the bonding of foam materials and cushions, upholstered furniture and mattresses or can be used for continuous coating purposes, such as profile sheathing (profile cladding/profile coating/ profile wrapping). Application can be made using known methods, e.g. by spraying, by injection, by nozzle (die) application or by roller application (roller coating).

Examples for the method according to the present invention and the adhesive components to be used in said methods are given in the following.

EXAMPLE 1

Isocyanate-Terminated Adhesive

A first adhesive component in the form of a thermoplastic granular material having the following composition was prepared:

Polyester having an average molecular weight of about 20,000 g/mol and an OH number of 5: 60 wt. %
Ethylene/vinylacetate copolymer having a VA content of 18% and a melting index of about 150: 20 wt. %
Low-molecular aromatic hydrocarbon resin having a softening range of from 75 to 85° C. and an acid number of less than 1 mg KOH/g: 20 wt. %

A second adhesive component was prepared in the form of a thermoplastic granular material having the following composition:

Polyisocyanate based on the cycloaliphatic 1-isocyanato-3-isocyanatomethyl-3,5,5-trimethyl-cyclohexane (IPDI) having an isocyanate content of 17% and a functionality between 3 and 4.

The first adhesive component was supplied via a first feed device of a single-screw extruder heated to 200° C. to the conveying track of the extruder whilst the second adhesive component was supplied in a dosed fashion via a second feed device with a mixing ratio of 7:1. The melting capacity was 120 kg/hour.

An isocyanate-terminated reactive hot-melt adhesive was obtained with which it was possible to manufacture profiles consisting of MDF (Medium Density Fiberboard) or chipboard cores with veneer, decorative paper or plastic films using known profile sheathing plants profile cladding installations).

EXAMPLE 2

Silane-Functionalized Adhesive

A first adhesive component was prepared in the form of a thermoplastic granular material with the following composition:

31.2 wt. % polyolefin
  (Vestoplast 708, Degussa Hüls AG)
62.4 wt. % Hydrocarbon resin
  (Escorez 5320, Exxon Deutschland GmbH)
6.2 wt. % Wax
  (Paraflint)
0.2 wt. % Dibutyl tin dilaurate catalyst
  (DBTL from Huntsmann Corp.)

A second adhesive component was prepared in the form of a thermoplastic granular material having the following composition:

95 wt. % silanized polyolefin
  (Vestoplast 206 V, Degussa Hüls AG)
5 wt. % PEwax
  (Polywachs 1000)

The first adhesive component was supplied via a first feed device of a single-screw extruder heated to 200° C. to the conveying track of the extruder whilst the second adhesive component was supplied in a dosed fashion via a second feed device with a mixing ratio of 1:1.9. The melting capacity was 120 kg/hour.

A silane-functionalized reactive hot-melt adhesive was obtained with which it was possible to manufacture profiles consisting of MDF or chipboard cores with veneer, decorative paper or plastic films using known profile sheathing plants (profile cladding installations).

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. A reactive isocyanate-terminated multicomponent coating and/or adhesive material comprising as separate components:
   (a) a first component in granular from comprising an isocyanate-reactive polymer having a molecular weight $M_n$ of at least 8,000 g/mol wherein the content of said isocyanate-reactive polymer in said first component is 20 to 100 wt %; and
   (b) a second component in granular form comprising a reactive isocyanate-terminated cross-linking agent comprising an isocyanate solid at room-temperature;
   wherein the reactive multicomponent coating and/or adhesive material further comprises a polymer which is not isocyanate-reactive and which is selected from the group consisting of an ethylene/vinyl-acetate copolymer, a polyolefin and mixtures thereof.

2. The multicomponent coating and/or adhesive material of claim 1, wherein the ethylene/vinylacetate copolymer has a vinyl-acetate content of form 12 to 40% and a melting indice of from 8 to 800.

3. The multi component coating and/or adhesive material of claim 1, wherein the polyolefin has an average molecular weight $M_n$ of from 5,000 to 25,000 g/mol, and a softening range of from 80° to 170° C.

4. The multicomponent coating and/or adhesive material of claim 1, wherein the first component contains 5 to 35 wt % of said non-isocyanate-reactive polymer.

5. The multicomponent coating and/or adhesive material of claim 1, wherein said isocyanate solid at room temperature is selected from the group consisting of 4,4'-diisocyanato-diphenylmethane (MDI), 4,4',4"-triisocyanato-triphenylmethane, tris-(4-isocyanatophenyl)-thiophosphate, 1,5-diisocyanato-naphthalene (NDI) and isomers thereof, dimers of 2,4-diisocyanato-toluene (TDI) and of 1-isocyanato-3-isocyanatomethyl-3,5,5-trimethylcyclohexane (IPDI) and their hydration products, trimers of 1-isocyanato-3-isocyanatomethyl-3,5,5-trimethylcyclohexane (IPDI) and mixtures thereof.

6. The multicomponent coating and/or adhesive material of claim 1, wherein the isocyanate-reactive starting polymer has an average molecular weight $M_n$ of from 8000 to 50,000 g/mol, wherein said isocyanate-reactive starting polymer is selected from the group consisting of polyesters, polycaprolactonepolyesters, polyethers, polyurethanes, polyamides, polytetrahydrofuranes, and mixtures thereof and has at least two isocyanate-reactive groups with reactive hydrogen atoms per molecule.

7. The multicomponent coating and/or adhesive material of claim 1, wherein the content of said isocyanate-reactive polymer is 50 to 95 wt. %.

8. The multicomponent coating and/or adhesive material of claim 1, wherein at least one of (a) and (b) comprise at least one resin, wherein said resin is selected from the group consisting of aliphatic, cyclic or cycloaliphatic hydrocarbon resins, terpene phenol resins, cumarone-indene resins, α-methyl styrene resins, polymerized tall resin esters, ketone aldehyde resins and mixtures thereof and wherein said resin has an acid number of less than 1 mg KOH/g and wherein the respective content of said resin in one or more components if from 0 to 70 wt. %.

9. The multicomponent coating and/or adhesive material of claim 1, wherein the mixing ratio of (a) and (b) if from 20:1 to 1:20.

10. The multicomponent coating and/or adhesive material of claim 1, wherein at least one of said (a) and (b) comprises at least one further additive known per se with respect to reactive adhesives.

11. The multicomponent coating and/or adhesive material of claim 1, wherein said material is moisture-reactive.

12. A method of bonding materials or continuously coating materials comprising applying the multicomponent coating and/or adhesive material of claim 1 to the material to be bonded or continuously coated.

13. The method of claim 12 wherein the applying is by spraying, by injection, by nozzle application or by roller application.

14. The method of claim 12 wherein the materials are bonded and said materials are foam materials and cushions, upholstered furniture and mattresses.

15. The method of claim 12 wherein the continuous coating is for profile sheathing or cladding.

16. The multicomponent coating and/or adhesive material of claim 1 wherein the polyolefin has an average molecular weight $M_n$ of from 10,000 to 20,000 g/mole and a softening range of from 80° to 130° C.

17. The multicomponent coating and/or adhesive material of claim 1 wherein the isocyanate-reactive polymer has an average molecular weight of from 10,000 to 30,000 g/mol.

18. The multicomponent coating and/or adhesive material of claim 10 wherein the least one further additive is at least one of a softener optionally based on phthalic acid or a phosphoric acid ester, glycol acetate, high-boiling organic oils, esters or other additives inducing plastification, stabilizers, antioxidant agents, acidtrapping agents, and age inhibitors.

19. The multicomponent coating and/or adhesive material of claim 8 wherein the respective amount of said resin in said least one component is 5 to 35 wt %.

20. A method for preparing a reactive isocyanate-terminated multicomponent coating and/or adhesive material comprising:
 (a) mixing or blending a first and a second component, each of said first and second components being in granular form, wherein:
  (i) the first component comprises an isocyanate-reactive starting polymer having a molecular weight $M_n$ of at least 8,000 g/mol, wherein the content of said isocyanate-reactive polymer in said first component is 20 to 100 wt. %; and
  (ii) the second component comprises a reactive isocyanate-terminated cross-linking agent comprising an isocyanate solid at room-temperature; and
 wherein said multicomponent coating and/or adhesive material further comprises a polymer which is not isocyanate-reactive and a polyolefin having an average molecular weight $M_n$ of from 5,000 to 25,000 g/mol and a softening range of from 80 to 170° C.; and (b) heating the components while mixing or blending to a liquid state.

21. The method of claim 20 wherein the resulting reactive multicomponent coating and/or adhesive material, immediately after being prepared, is applied, optionally via an intermediate container, by spraying, by injection, by nozzle application or by roller application.

22. The method of claim 20 wherein the resulting reactive multicomponent coating and/or adhesive material, immediately after being prepared, is fed or conveyed, optionally via intermediate containers, to a profile sheathing plant or to a coating plant.

23. The method of claim 20 wherein the content of said non-isocyanate-reactive polymer in said first component is in the range of from 5 to 35 wt %.

24. The method of claim 20 wherein said isocyanate solid at room temperature is selected from the group consisting of 4,4'-diisocyanato-diphenylmethane, (MDI), 4,4',4"-triisocyanato-triphenylmethane, tris-(4-isocyanatophenyl)-thiophosphate, 1,5-diisocyanato-naphthalene (NDI) and isomers thereof, dimers of 2,4-diisocyanato-toluene (TDI) and of 1-isocyanato-3-isocyanatomethyl-3,5,5-trimethylcyclohexane (IPDI) and their hydration products, trimers of 1-isocyanato-3-isocyanatomethyl-3,5,5-trimethyl-cyclohexane (IPDI) and mixtures thereof.

25. The method of claim 20 wherein said isocyanate-reactive polymer has an average molecular weight of from 8,000 to 50,000 g/mol, and wherein said isocyanate-reactive polymer is selected from the group consisting of polyesters, polycaprolactonepolyesters, polyethers, polyurethanes, polyamides, polytetrahydrofuranes and mixtures thereof and has at least two isocyanate-reactive groups with reactive hydrogen atoms per molecule.

26. The method of claim 20 wherein said first component has a content of said isocyanate-cyanate-reactive starting polymer from 50 to 95 wt. %.

27. The method of claim 20 wherein at least one or more of the components has at least one resin, wherein said resin is selected from the group consisting of aliphatic, cyclic or cycloaliphatic hydrocarbon resins, terpene phenol resins, cumarone-indene resins, α-methyl styrene resins, polymerized tall resin esters, ketone aldehyde resins and mixtures thereof and wherein said resin has an acid number of less than 1 mg KOH/g and wherein the respective amount of said resin in said least one component is 0 to 70 wt. %.

28. The method of claim 20 wherein said first and said second components have a mixing ratio of from 20:1 to 1:20.

29. The method of claim 20 wherein the polyolefin has an average molecular weight $M_n$ of from 10,000 to 20,000 g/mole and a softening range from 80° to 130°.

30. The method of claim 27 wherein the respective amount of said resin in said least one component is 5 to 35 wt %.

* * * * *